United States Patent
Ando et al.

(10) Patent No.: US 9,709,166 B2
(45) Date of Patent: Jul. 18, 2017

(54) CONTROL DEVICE OF LOCK-UP CLUTCH (71) Applicant: TOYOTA JIDOSHA KABUSHIKI KAISHA, Toyota-shi (JP)

(72) Inventors: Takayuki Ando, Sunto-gun (JP); Seiji Kuwahara, Susono (JP); Shuntaro Shinohara, Susono (JP); Ryosuke Mizuto, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/290,520

(22) Filed: Oct. 11, 2016

(65) Prior Publication Data
US 2017/0130827 A1    May 11, 2017

(30) Foreign Application Priority Data
Nov. 11, 2015    (JP) .................................. 2015-220926

(51) Int. Cl.
*F16H 61/14*    (2006.01)
*F16D 48/06*    (2006.01)

(52) U.S. Cl.
CPC .......... *F16H 61/143* (2013.01); *F16D 48/06* (2013.01); *F16D 2500/10412* (2013.01); *F16D 2500/304* (2013.01); *F16D 2500/3144* (2013.01); *F16H 2061/145* (2013.01)

(58) Field of Classification Search
None
See application file for complete search history.

(56) References Cited

U.S. PATENT DOCUMENTS

| 6,152,852 A * | 11/2000 | Sakakibara | ........... F16H 61/143 |
| | | | 477/168 |
| 8,306,715 B2 | 11/2012 | Moriya et al. | |
| 2011/0130933 A1* | 6/2011 | Muto | ...................... F16H 59/20 |
| | | | 701/58 |
| 2012/0142494 A1* | 6/2012 | Yamada | .............. B60W 10/026 |
| | | | 477/175 |
| 2012/0143453 A1* | 6/2012 | Nagami | ................ F16H 61/143 |
| | | | 701/68 |

FOREIGN PATENT DOCUMENTS

| JP | 2002-130461 | 5/2002 |
| JP | 2002-130464 | 5/2002 |
| JP | 2010-38300 | 2/2010 |
| JP | 2010-216506 | 9/2010 |

* cited by examiner

Primary Examiner — Edwin A Young
(74) Attorney, Agent, or Firm — Oblon, McClelland, Maier & Neustadt, L.L.P.

(57) ABSTRACT

A control device includes a deceleration flex-torque calculation unit that calculates a target torque capacity of a lock-up clutch when a state of the lock-up clutch is controlled to a deceleration flex control state, an acceleration flex-torque calculation unit that calculates a target torque capacity of the lock-up clutch when the state of the lock-up clutch is controlled to an acceleration flex control state, and a control unit that controls a torque capacity of the lock-up clutch to a target torque capacity calculated by the acceleration flex-torque calculation unit, during a period until a target torque capacity calculated by the acceleration flex-torque calculation unit falls below a target torque capacity calculated by the deceleration flex-torque calculation unit, when the state of the lock-up clutch is shifted from the acceleration flex control state to the deceleration flex control state.

6 Claims, 6 Drawing Sheets

CONTROL DEVICE OF LOCK-UP CLUTCH

CROSS-REFERENCE TO RELATED APPLICATION(S)

The present application claims priority to and incorporates by reference the entire contents of Japanese Patent Application No. 2015-220926 filed in Japan on Nov. 11, 2015.

BACKGROUND OF THE INVENTION

1. Field of the Invention

The present disclosure relates to a control device of a lock-up clutch.

2. Description of the Related Art

Generally, a vehicle including a torque converter that transmits output torque of an engine to a transmission and a lock-up clutch that can directly connect the engine side of the torque converter to the transmission side has been known. In such a vehicle, a control device executes drive control of the state of the lock-up clutch to any of an engaged state, a released state, and a slipped state depending on an accelerator operation amount and a vehicle speed. As the slipped state of the lock-up clutch, there are a deceleration flex control state in which the differential rotation speed (input-shaft rotation speed−output-shaft rotation speed) of the lock-up clutch is controlled to a negative value when the accelerator operation amount is zero, and an acceleration flex control state in which the differential rotation speed of the lock-up clutch is controlled to a positive value when the accelerator operation amount is greater than zero.

In the conventional drive control of the lock-up clutch, when the state of the lock-up clutch is shifted from the acceleration flex control state to the deceleration flex control state in accordance with the accelerator operation amount becoming zero, a target torque capacity (a target hydraulic pressure) of the lock-up clutch has been immediately switched from the target torque capacity in the acceleration flex control state to the target torque capacity in the deceleration flex control state. However, the output torque of the engine input to the lock-up clutch decreases with a delay from a point in time when the accelerator operation amount becomes zero. Therefore, if the target torque capacity of the lock-up clutch is switched to the target torque capacity in the deceleration flex control state at a point in time when the accelerator operation amount becomes zero, the torque capacity of the lock-up clutch becomes insufficient with respect to the output torque of the engine, and the blow-up of the engine speed may occur.

Due to such background, Japanese Laid-open Patent Publication No. 2010-216506 has proposed an invention that suppresses the blow-up of the engine speed when the state of the lock-up clutch is shifted from the acceleration flex control state to the deceleration flex control state. More specifically, in the invention described in Japanese Laid-open Patent Publication No. 2010-216506, when the state of the lock-up clutch is shifted from the acceleration flex control state to the deceleration flex control state, the state of the lock-up clutch is fixed to the acceleration flex control state during a predetermined time until the output torque of the engine decreases.

SUMMARY OF THE INVENTION

It is an object of the present disclosure to at least partially solve the problems in the conventional technology.

According to an aspect of the present disclosure, a control device of a lock-up clutch that is mounted on a vehicle including a torque converter that transmits output torque of an engine to a transmission and a lock-up clutch that can directly connect a side of the engine with a side of the transmission of the torque converter, and controls a state of the lock-up clutch to any one of an engaged state, a released state, a deceleration flex control state in which a differential rotation speed of the lock-up clutch being a rotation speed obtained by subtracting a rotation speed of an output shaft from a rotation speed of an input shaft of the lock-up clutch is controlled to a negative value when an accelerator operation amount is zero, and an acceleration flex control state in which the differential rotation speed of the lock-up clutch is controlled to a positive value when the accelerator operation amount is greater than zero, the control device of the lock-up clutch including: a deceleration flex-torque calculation unit calculating a target torque capacity of the lock-up clutch when the state of the lock-up clutch is controlled to the deceleration flex control state; an acceleration flex-torque calculation unit calculating a target torque capacity of the lock-up clutch when the state of the lock-up clutch is controlled to the acceleration flex control state; and a control unit controlling a torque capacity of the lock-up clutch to a target torque capacity calculated by the acceleration flex-torque calculation unit, during a period until a target torque capacity calculated by the acceleration flex-torque calculation unit falls below a target torque capacity calculated by the deceleration flex-torque calculation unit, when the state of the lock-up clutch is shifted from the acceleration flex control state to the deceleration flex control state in accordance with the accelerator operation amount becoming zero.

The above and other objects, features, advantages and technical and industrial significance of this disclosure will be better understood by reading the following detailed description of presently preferred embodiments of the disclosure, when considered in connection with the accompanying drawings.

DETAILED DESCRIPTION OF THE PREFERRED EMBODIMENTS

According to the invention of Japanese Laid-open Patent Publication No. 2010-216506, while the state of the lock-up clutch is fixed to the acceleration flex control state, a target torque capacity that falls below the target torque capacity of the lock-up clutch in the deceleration flex control state may be calculated. As a result, after the predetermined time has passed, when the state of the lock-up clutch is shifted from the acceleration flex control state to the deceleration flex control state, an undershoot of the differential rotation speed, which is a phenomenon in which the differential rotation speed of the lock-up clutch falls below the target differential rotation speed, may occur.

A control device of a lock-up clutch according to an embodiment of the present disclosure will be explained below with reference to the accompanying drawings.

Configuration of Vehicle

First, a configuration of a vehicle is described with reference to FIG. 1 to which a control device of a lock-up clutch according to an embodiment of the present disclosure is applied.

Figure 1:
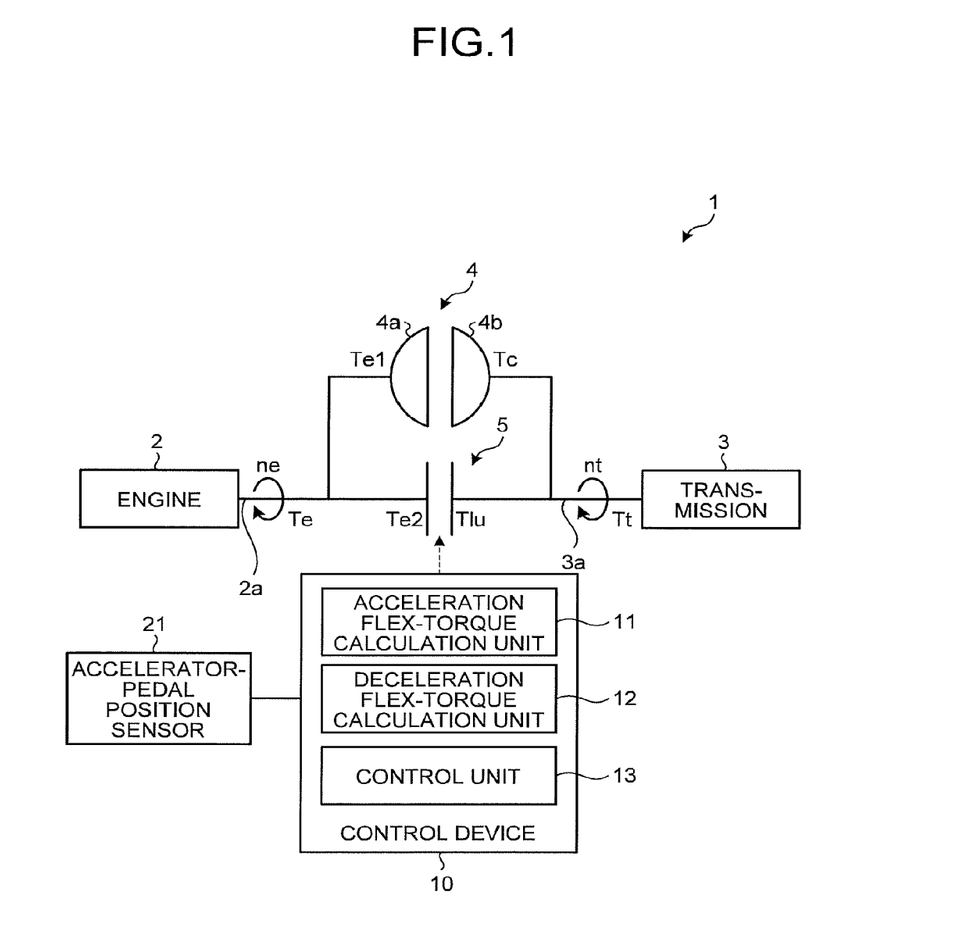
FIG. 1 is a schematic diagram illustrating a configuration of a control device of a lock-up clutch according to an embodiment of the present disclosure and a vehicle to which the control device is applied.

FIG. 1 is a schematic diagram illustrating a configuration of the control device of the lock-up clutch according to the embodiment of the present disclosure and a vehicle to which the control device is applied. As illustrated in FIG. 1, a vehicle 1 to which the control device of the lock-up clutch according to the embodiment of the present disclosure is applied includes an engine 2, a transmission 3, a torque converter 4, and a lock-up clutch 5 as main constituent elements.

The engine 2 is an internal combustion engine such as a gasoline engine or a diesel engine that generates a driving force by combusting fuel injected into, for example, a cylinder. Reference signs ne and Te in FIG. 1 respectively denote a rotation speed of the engine 2 (hereinafter, "engine speed") and output torque thereof.

The transmission 3 changes output torque Tt, which is the sum of output torque Tc of the torque converter 4 and output torque Tlu of the lock-up clutch 5, and then transmits the output torque Tt to drive wheels (not illustrated). As the transmission 3, an automatic transmission (AT), a continuously variable transmission (CVT), or the like can be exemplified. Reference sign nt in FIG. 1 denotes a turbine rotation speed, which is the rotation speed of an input shaft of the transmission 3 (an output shaft of the torque converter 4).

The torque converter 4 is a fluid power transmission device that transmits power via fluid and includes a pump impeller 4a corresponding to an input rotation member coupled with a crankshaft 2a of the engine 2, and a turbine impeller 4b corresponding to an output rotation member coupled with the transmission 3 via a turbine shaft 3a. Reference sign Te1 in FIG. 1 denotes input torque of the torque converter 4.

In the torque converter 4 having such a configuration, in a driven state in which a speed ratio (turbine rotation speed nt/engine speed ne) is greater than 1, fluid flows from the side of the turbine impeller 4b to the side of the pump impeller 4a in a state with a stator (not illustrated) provided between the pump impeller 4a and the turbine impeller 4b rotating (in a state in which the torque is not being amplified). On the other hand, in a driving state in which the speed ratio is equal to or less than 1, a fluid flows from the side of the pump impeller 4a to the side of the turbine impeller 4b in a state with the stator (not illustrated) being fixed (in a state in which the torque is being amplified).

The lock-up clutch 5 directly connects an input side and an output side of the torque converter 4 mechanically in the engaged state, and invalidates a fluid power transmission function by the pump impeller 4a and the turbine impeller 4b of the torque converter 4. The lock-up clutch 5 is drive-controlled by the control of a control device 10 in the engaged state, the released state, or the slipped state (a half-engaged state). The engaged state means a state in which the input side and the output side of the torque converter 4 are directly engaged with each other, and the released state means a state in which the engaged state is released.

The slipped state means an intermediate state between the engaged state and the released state, that is, a state in which relative rotation of the input side and the output side of the torque converter 4 is allowed to some extent and the input side and the output side are partially engaged with each other. The slipped state of the lock-up clutch 5 includes a deceleration flex control state in which a differential rotation speed of the lock-up clutch 5 (engine speed ne−turbine rotation speed nt) is controlled to a negative value when the position of an accelerator pedal (an accelerator operation amount) is zero, and an acceleration flex control state in which the differential rotation speed of the lock-up clutch 5 is controlled to a positive value when the position of the accelerator pedal is greater than zero. Reference sign Te2 in FIG. 1 denotes the input torque of the lock-up clutch 5.

Configuration of Control Device

A configuration of the control device of the lock-up clutch according to the embodiment of the present disclosure is described next with reference to FIG. 1

As illustrated in FIG. 1, the control device 10 of the lock-up clutch according to the embodiment of the present disclosure is configured by a CPU (Central Processing Unit) (not illustrated), a storage device, and an ECU (Electronic Control Unit) including an input/output buffer, and the CPU executes a control program stored in the storage device to control the operation of the entire control device 10. In the present embodiment, the CPU (not illustrated) executes the control program stored in the storage device so that the control device 10 functions as an acceleration flex-torque calculation unit 11, a deceleration flex-torque calculation unit 12, and a control unit 13. Functions of the respective units are described later. An accelerator-pedal position sensor 21 that detects the position (%) of an accelerator pedal of the vehicle 1 is connected to the control device 10. The accelerator-pedal position sensor 21 outputs an electric signal indicating the detected position of the accelerator pedal to the control device 10.

The control device 10 of the lock-up clutch having such a configuration performs a shifting process described below to suppress occurrence of the blow-up of the engine speed and an undershoot of the differential rotation speed, when the state of the lock-up clutch is shifted from the acceleration flex control state to the deceleration flex control state in accordance with the position of the accelerator pedal becoming zero. The operation of the control device 10 of the lock-up clutch when performing the shifting process according to the embodiment of the present disclosure is described with reference to FIGS. 2 to 5.

Shifting Process

Figure 2:
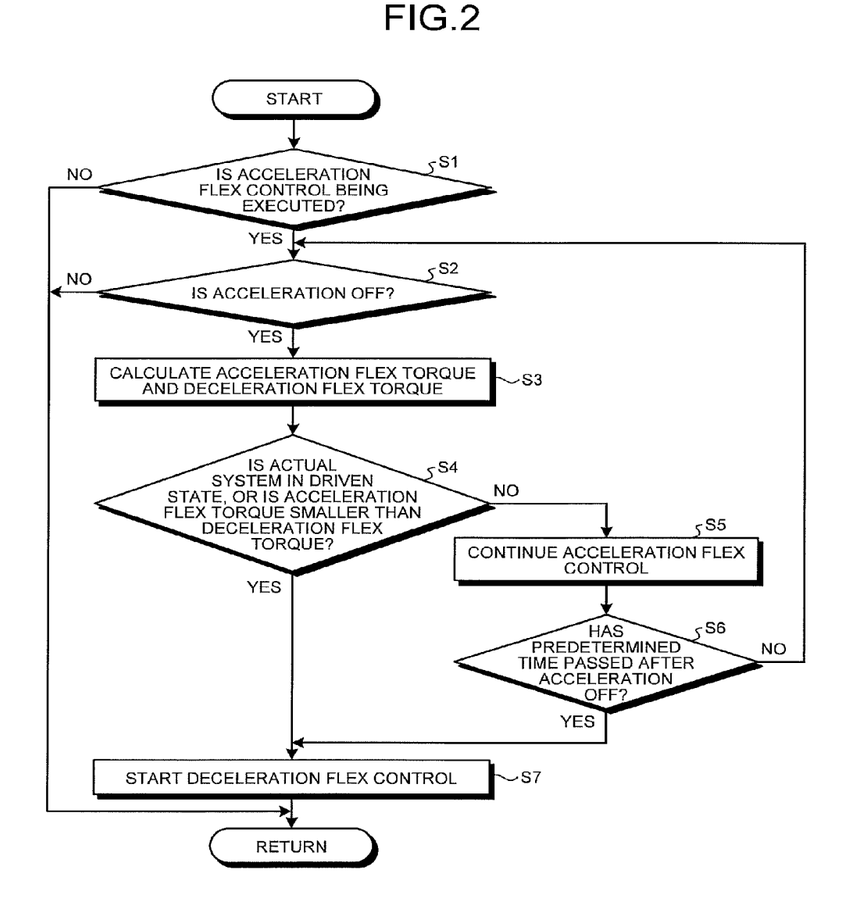
FIG. 2 is a flowchart of a shifting process according to the embodiment of the present disclosure.
Figure 3:
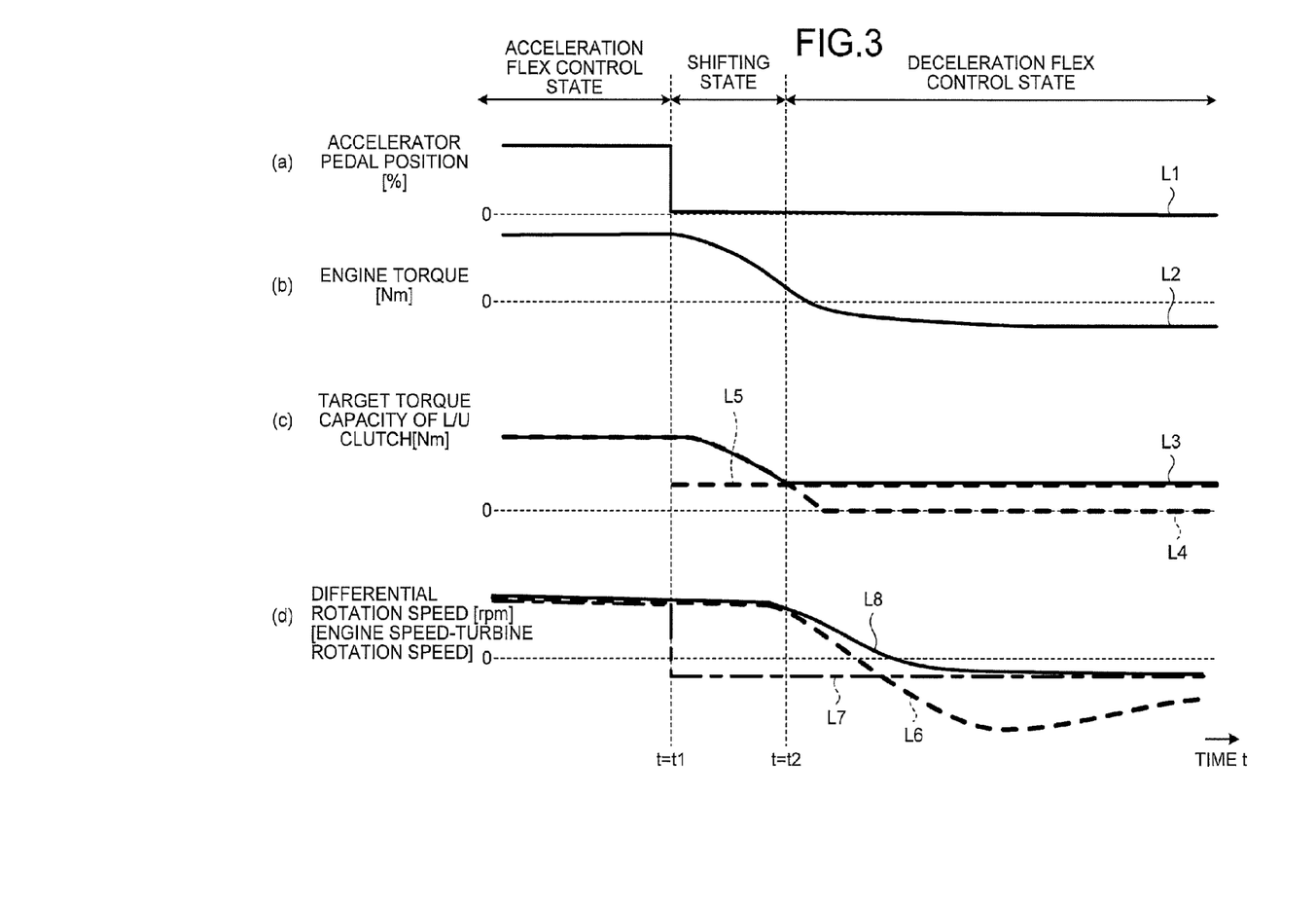
FIG. 3 is a timing chart explaining the shifting process according to the embodiment of the present disclosure.
Figure 4:
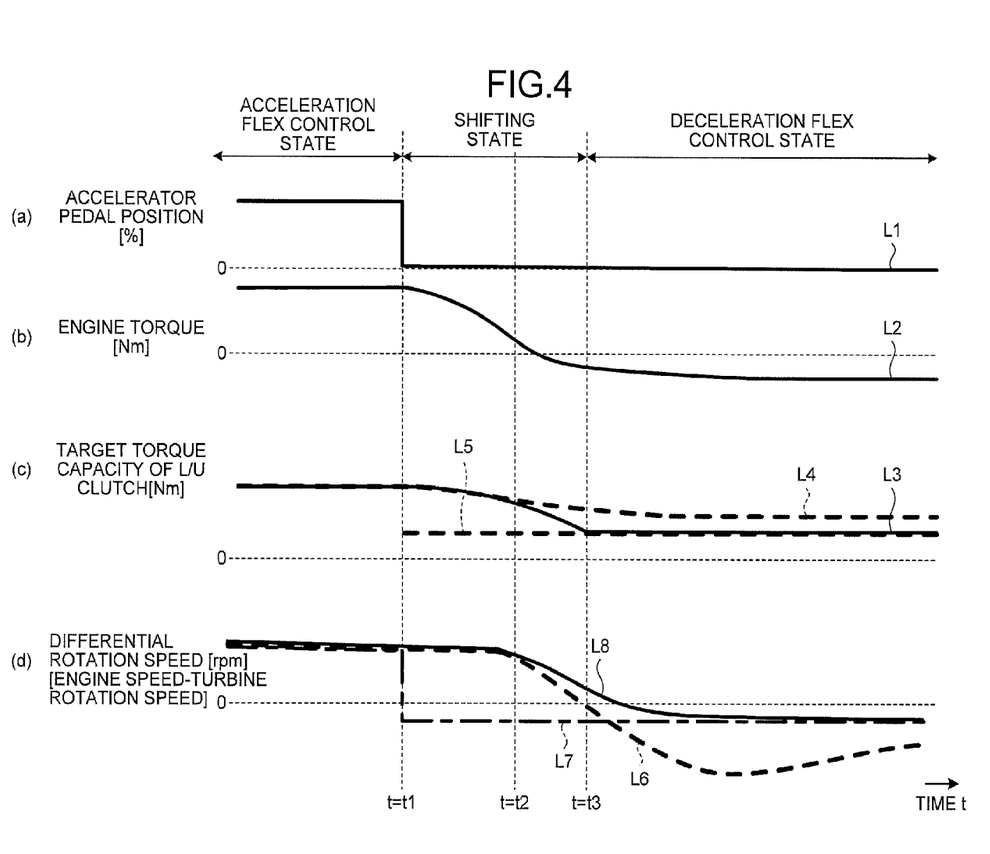
FIG. 4 is a timing chart explaining a modification of the shifting process according to the embodiment of the present disclosure.
Figure 5:
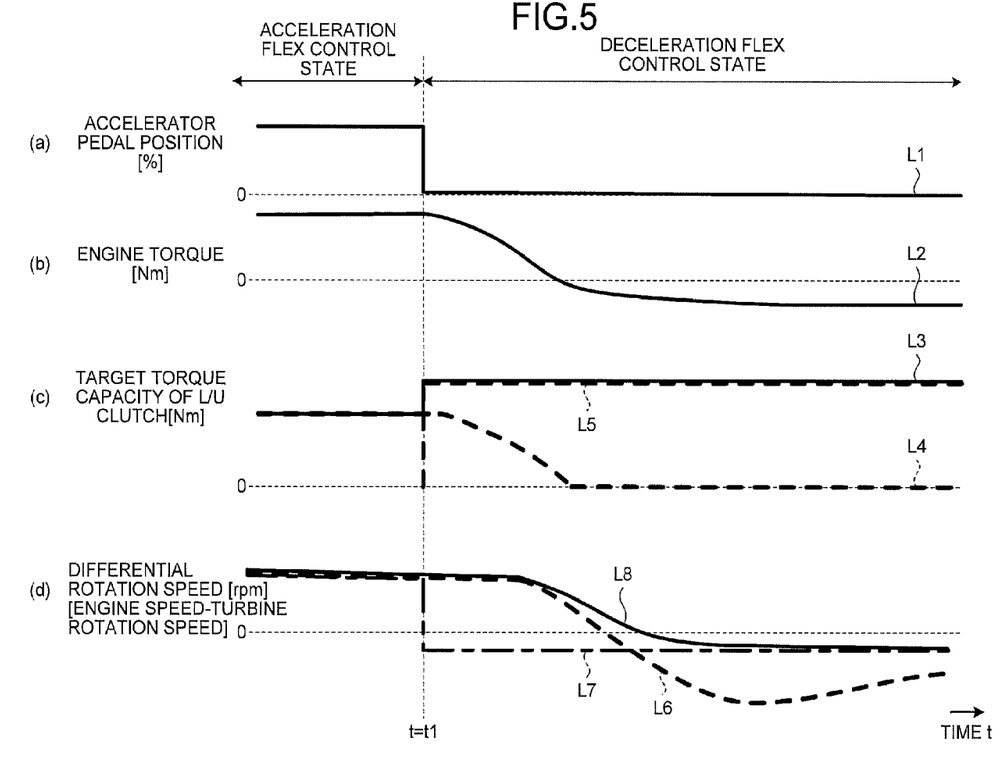
FIG. 5 is a timing chart explaining a modification of the shifting process according to the embodiment of the present disclosure.

FIG. 2 is a flowchart illustrating the shifting process according to the embodiment of the present disclosure. FIG. 3 is a timing chart explaining the shifting process according to the embodiment of the present disclosure. FIGS. 4 and 5 are timing charts explaining modifications of the shifting process according to the embodiment of the present disclosure. The flowchart illustrated in FIG. 2 is started at a timing at which the control device 10 of the lock-up clutch is activated and a switching process proceeds to a process in step S1.

In the process in step S1, the control device 10 determines whether the current state of the lock-up clutch 5 is the acceleration flex control state (acceleration flex control is being executed). It can be determined whether the current state of the lock-up clutch 5 is the acceleration flex control state by confirming a state of a flag to be switched to the ON state when the state of the lock-up clutch is the acceleration flex control state. As a result of the determination, if the current state of the lock-up clutch 5 is not the acceleration flex control state (NO in step S1), the control device 10 finishes the switching process and starts the switching process again after a predetermined time has passed. On the other hand, if the current state of the lock-up clutch 5 is the acceleration flex control state (YES in step S1), the control device 10 advances the switching process to a process in step S2.

In the process instep S2, the control device 10 determines whether the position of the accelerator pedal is zero (acceleration OFF) based on the electric signal output from the accelerator-pedal position sensor 21. As a result of the determination, if the position of the accelerator pedal is not zero (NO in step S2), the control device 10 finishes the switching process and starts the switching process again after the predetermined time has passed. On the other hand, if the position of the accelerator pedal is zero (YES in step S2), the control device 10 determines that the shifting condition from the acceleration flex control state to the deceleration flex control state is established (a time t=t1 illustrated in FIG. 3), activates a timer to measure an elapsed time since the position of the accelerator pedal has become zero, and advances the switching process to a process in step S3.

In the process in step S3, the acceleration flex-torque calculation unit 11 first calculates the target torque capacity of the lock-up clutch 5 (acceleration flex torque) when the state of the lock-up clutch 5 is to be controlled to the acceleration flex control state. Specifically, the acceleration flex-torque calculation unit 11 assigns a torque capacity coefficient C and the engine speed ne obtained from the speed ratio of the torque converter 4 to a formula: $C \times (ne)^2$ to calculate the torque capacity of the torque converter 4.

The acceleration flex-torque calculation unit 11 then adds inertia torque of the engine 2 and inertia torque of the torque converter 4 to a value obtained by multiplying a difference value between the differential rotation speed of the torque converter 4 calculated based on a model formula of the torque converter 4 and a target differential rotation speed in the acceleration flex control state by a coefficient, and calculates a value obtained by subtracting the torque capacity of the torque converter 4 from the added value. The target differential rotation speed in the acceleration flex control state is decided by reading the target differential rotation speed corresponding to the current vehicle speed from a table indicating a relation between the target differential rotation speed in the acceleration flex control state and the vehicle speed. The acceleration flex-torque calculation unit 11 calculates a value obtained by multiplying the subtracted value by a feed forward control gain as a target torque capacity of the lock-up clutch 5 for controlling the actual differential rotation speed of the torque converter 4 to the target differential rotation speed in the acceleration flex control state by the feed forward control (an FF torque capacity).

Next, the acceleration flex-torque calculation unit 11 calculates an integral value of a value obtained by multiplying the difference value between the actual differential rotation speed of the torque converter 4 and the target differential rotation speed in the acceleration flex control state by an inclination of the torque capacity described above, and adds the inertia torque of the engine 2 and the inertia torque of the torque converter 4 to the integral value. The acceleration flex-torque calculation unit 11 calculates a value obtained by multiplying the added value by a feedback control gain as the target torque capacity of the lock-up clutch 5 for controlling the actual differential rotation speed of the torque converter 4 to the target differential rotation speed in the acceleration flex control state by the feedback control (an FB torque capacity). The acceleration flex-torque calculation unit 11 calculates the sum of the FF torque capacity, the FB torque capacity, and a learned torque capacity learned in order to correct an error of the target torque capacity caused by an individual difference of the lock-up clutch 5, as the target torque capacity of the lock-up clutch 5 in the acceleration flex control state (the acceleration flex torque).

The deceleration flex-torque calculation unit 12 then calculates a target torque capacity of the lock-up clutch 5 when the state of the lock-up clutch 5 is controlled to the deceleration flex control state (deceleration flex torque). The calculation method of the target torque capacity of the lock-up clutch 5 when the state of the lock-up clutch 5 is controlled to the deceleration flex control state is not particularly limited. However, in the present embodiment, the target torque capacity is calculated as described below. That is, as in the process performed by the acceleration flex-torque calculation unit 11, the deceleration flex-torque calculation unit 12 calculates the target torque capacity of the lock-up clutch 5 for controlling the actual differential rotation speed of the torque converter 4 to the target differential rotation speed in the deceleration flex control state by the feed forward control (the FF torque capacity).

The deceleration flex-torque calculation unit 12 calculates the sum of the FF torque capacity and the learned torque capacity as the target torque capacity of the lock-up clutch 5 in the deceleration flex control state (the deceleration flex torque). In the present embodiment, the target torque capacity of the lock-up clutch 5 is calculated. However, a hydraulic pressure to be applied in order to realize the target torque capacity of the lock-up clutch 5 can be calculated. The FB torque capacity is not included in the target torque capacity of the lock-up clutch 5 in the deceleration flex control state, thereby enabling to suppress a stepwise change of the target torque capacity when the state of the lock-up clutch 5 is switched to the deceleration flex control state and the FB torque capacity is reset to zero. Accordingly, the process in step S3 is finished and the switching process proceeds to a process in step S4.

In the process in step S4, the control unit 13 determines whether the torque converter 4 (an actual system) is in a driven state, and whether the target torque capacity of the lock-up clutch 5 calculated by the acceleration flex-torque calculation unit 11 becomes less than the target torque capacity calculated by the deceleration flex-torque calculation unit 12. Because the target torque capacity in the deceleration flex control state is a negative value, when comparing a magnitude relation of the target torque capacity between the acceleration flex control state and the deceleration flex control state, the sign of the target torque capacity in the deceleration flex control state is matched with the sign of the target torque capacity in the acceleration flex control state. It can be determined whether the torque converter 4 is in the driven state by determining whether the speed ratio of the torque converter 4 is greater than 1.

As a result of the determination, if the torque converter 4 is in the driving state (the speed ratio is equal to or less than 1) and the target torque capacity of the lock-up clutch 5 calculated by the acceleration flex-torque calculation unit 11 is equal to or greater than the target torque capacity calculated by the deceleration flex-torque calculation unit 12 (NO in step S4), the control unit 13 advances the switching process to a process in step S5. On the other hand, if the torque converter 4 is in the driven state (the speed ratio is greater than 1) or the target torque capacity of the lock-up clutch 5 calculated by the acceleration flex-torque calculation unit 11 is less than the target torque capacity calculated by the deceleration flex-torque calculation unit 12 (YES in step S4), the control unit 13 advances the switching process to a process in step S7.

In the process in step S5, the control unit 13 executes control so that the target torque capacity of the lock-up clutch 5 becomes the target torque capacity calculated by the acceleration flex-torque calculation unit 11, thereby maintaining the state of the lock-up clutch 5 in the acceleration flex control state (continuing the acceleration flex control). Specifically, as illustrated in FIG. 3, when the position (a line L1) of the accelerator pedal becomes zero at the time t=t1 and the output torque (a line L2) of the engine starts to decrease, the control unit 13 controls, during the time from t=t1 to t=t2, the target torque capacity (a line L3) of the lock-up clutch 5 to the target torque capacity calculated by the acceleration flex-torque calculation unit 11 (a line L4). Accordingly, the process in step S5 is finished, and the switching process proceeds to a process in step S6.

In the process in step S6, the control unit 13 determines whether a predetermined time has passed since the position of the accelerator pedal becoming zero (acceleration OFF). As a result of the determination, if the predetermined time has not passed since the position of the accelerator pedal becoming zero (NO in step S6), the control unit 13 returns the switching process to the process in step S2. On the other hand, if the predetermined time has passed since the position of the accelerator pedal becoming zero (YES in step S6), the control unit 13 advances the switching process to a process in step S7 in order to switch the state of the lock-up clutch 5 to the deceleration flex control state. At the stage when the predetermined time has passed since the position of the accelerator pedal becoming zero, by switching the state of the lock-up clutch 5 to the deceleration flex control state, it can be suppressed that the shifting to the deceleration flex control state is delayed.

Normally, after a short time since the position of the accelerator pedal has become zero, the torque converter 4 becomes in the driven state, or the target torque capacity of the lock-up clutch 5 calculated by the acceleration flex-torque calculation unit 11 becomes less than the target torque capacity calculated by the deceleration flex-torque calculation unit 12. Accordingly, the predetermined time described above, including variation, can be decided based on the time since the position of the accelerator pedal has become zero until the torque converter 4 becomes in the driven state or the target torque capacity of the lock-up clutch 5 calculated by the acceleration flex-torque calculation unit 11 becomes less than the target torque capacity calculated by the deceleration flex-torque calculation unit 12.

In the process in step S7, as in the process performed by the acceleration flex-torque calculation unit 11, the deceleration flex-torque calculation unit 12 calculates the target torque capacity of the lock-up clutch 5 for controlling the actual differential rotation speed of the torque converter 4 to the target differential rotation speed in the deceleration flex control state by the feed forward control and the feedback control (the FF torque capacity and the FB torque capacity). The deceleration flex-torque calculation unit 12 calculates the sum of the FF torque capacity, the FB torque capacity, and the learned torque capacity as the target torque capacity of the lock-up clutch 5 in the deceleration flex control state. The control device 10 executes control so that the torque capacity of the lock-up clutch 5 becomes the target torque capacity calculated by the deceleration flex-torque calculation unit 12. Specifically, as illustrated in FIG. 3, at and after the time t=t2, the control unit 13 controls the torque capacity (the line L3) of the lock-up clutch 5 to the target torque capacity calculated by the deceleration flex-torque calculation unit 12 (a line L5). Accordingly, the process in step S7 is finished, and the series of switching processes is finished.

As is obvious from the above descriptions, in the switching process according to the embodiment of the present disclosure, when the control unit 13 shifts the state of the lock-up clutch 5 from the acceleration flex control state to the deceleration flex control state in accordance with the position of the accelerator pedal becoming zero, the control unit 13 controls the torque capacity of the lock-up clutch 5 to the target torque capacity calculated by the acceleration flex-torque calculation unit 11, during a period until the target torque capacity calculated by the acceleration flex-torque calculation unit 11 falls below the target torque capacity calculated by the deceleration flex-torque calculation unit 12 (the time t=t1 to t2 illustrated in FIG. 3).

According to this configuration, when the state of the lock-up clutch 5 is switched from the acceleration flex control state to the deceleration flex control state, the target torque capacity of the lock-up clutch 5 does not change largely, and thus the blow-up of the engine speed can be suppressed. As illustrated in FIG. 3, at and after the time t=t2, as indicated by a line L6, an undershoot in which the differential rotation speed of the lock-up clutch 5 (engine speed−turbine rotation speed) falls below the target rotation speed of the lock-up clutch 5 indicated by a line L7 does not occur. Further, as indicated by a line L8, the differential rotation speed of the lock-up clutch 5 can be approximated to the target differential rotation speed of the lock-up clutch 5 indicated by the line L7.

In the present embodiment, if the torque converter 4 becomes in the driven state during the period until the target torque capacity calculated by the acceleration flex-torque calculation unit 11 falls below the target torque capacity calculated by the deceleration flex-torque calculation unit 12, the control unit 13 controls the state of the torque converter 4 in the deceleration flex control state. Therefore, the shifting condition from the acceleration flex control state to the deceleration flex control state, other than the target torque capacity of the lock-up clutch 5, can be included in the configuration of the embodiment. Accordingly, it can be suppressed that the shifting to the deceleration flex control state is delayed.

In the present embodiment, the state of the lock-up clutch 5 is switched to the deceleration flex control state at the stage when the predetermined time has passed since the position of the accelerator pedal becoming zero (YES in step S6, Step S7). At this time, as indicated by the line L3 in FIG. 4, the target torque capacity of the lock-up clutch 5 can be continuously decreased from the target torque capacity calculated by the acceleration flex-torque calculation unit 11 to the target torque capacity calculated by the deceleration flex-torque calculation unit 12 (the time t=t2 to t3) at a timing at which the predetermined time has passed since the position of the accelerator pedal becoming zero (the time t=t2). According to this configuration, because the target torque capacity is decreased in a stepwise manner, an undershoot of the torque capacity of the lock-up clutch 5 can be suppressed.

As illustrated in FIG. 5, at a point in time when the position of the accelerator pedal becomes zero (the time t=t1), if the target torque capacity calculated by the deceleration flex-torque calculation unit 12 (the line L5) is greater than the target torque capacity calculated by the acceleration flex-torque calculation unit 11 (the line L4), the control unit 13 can promptly switch the state of the lock-up clutch 5 from the acceleration flex control state to the deceleration flex control state.

EXAMPLE

Figure 6:
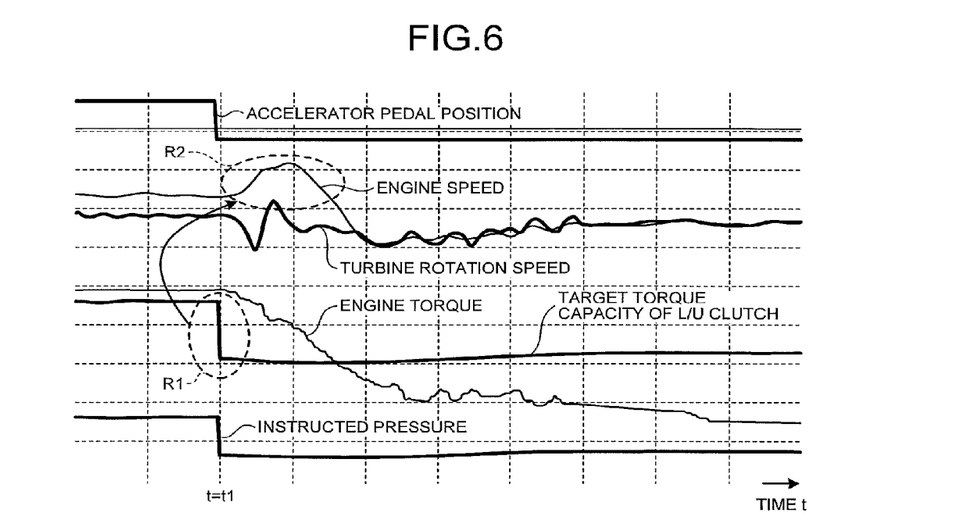
FIG. 6 is a diagram illustrating changes of an engine speed when a state of a lock-up clutch is shifted from an acceleration flex control state to a deceleration flex control state in the case where the present disclosure is not applied.
Figure 7:
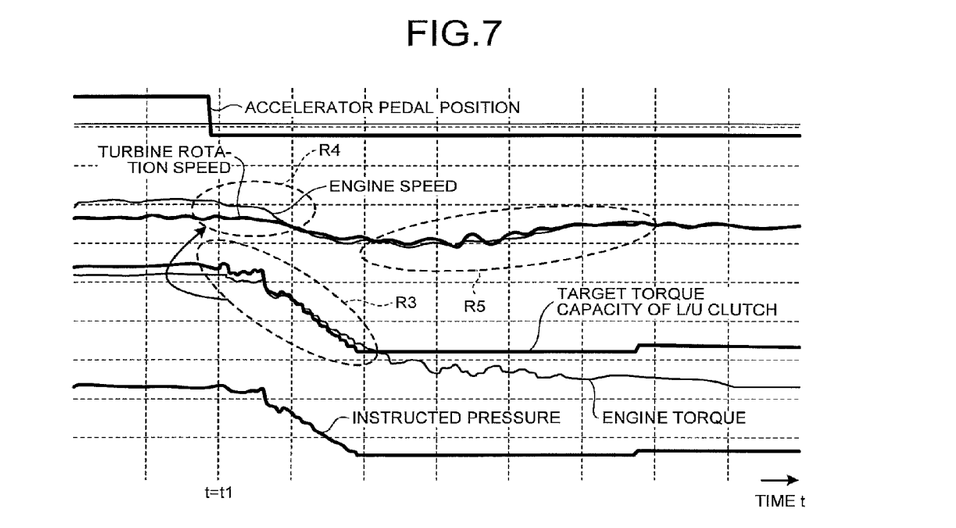
FIG. 7 is a diagram illustrating changes of the engine speed when the state of the lock-up clutch is shifted from the acceleration flex control state to the deceleration flex control state in the case where the present disclosure is applied.

Changes of the engine speed when the state of the lock-up clutch was shifted from the acceleration flex control state to the deceleration flex control state were evaluated in cases where the present disclosure was applied and the present disclosure was not applied. FIG. 6 is a diagram illustrating changes of the engine speed when the state of the lock-up clutch is shifted from the acceleration flex control state to the deceleration flex control state in the case where the present disclosure is not applied. FIG. 7 is a diagram illustrating changes of the engine speed when the state of the lock-up clutch is shifted from the acceleration flex control state to the deceleration flex control state in the case where the present disclosure is applied.

As illustrated in FIG. 6, when the present disclosure was not applied, at the time of shifting the state of the lock-up clutch from the acceleration flex control state to the deceleration flex control state in accordance with the position of the accelerator pedal becoming zero (the time t=t1), as illustrated in a region R1, the target torque capacity of the lock-up clutch (an instructed pressure) rapidly decreased. Therefore, as illustrated in a region R2, the blow-up of the engine speed was confirmed.

On the other hand, when the present disclosure was applied, at the time of shifting the state of the lock-up clutch from the acceleration flex control state to the deceleration flex control state (the time t=t1), as illustrated in a region R3, the target torque capacity of the lock-up clutch (an instructed pressure) did not decrease rapidly and followed the engine torque. Therefore, as illustrated in a region R4, the blow-up of the engine speed was suppressed. Further, as illustrated in a region R5, the difference between the engine speed and the turbine rotation speed was increased after the state of the lock-up clutch was shifted to the deceleration flex control state, and occurrence of an undershoot of the differential rotation speed of the lock-up clutch was suppressed.

According to an embodiment, a shifting condition from the acceleration flex control state to the deceleration flex control state, other than the target torque capacity of the lock-up clutch, can be included in the configuration. Accordingly, it can be suppressed that the shifting to the deceleration flex control state is delayed.

According to an embodiment, it can be suppressed that the shifting to the deceleration flex control state is delayed.

According to an embodiment, because the target torque capacity decreases in a stepwise manner, it can be suppressed that the torque capacity of the lock-up clutch undershoots.

According to the control device of the lock-up clutch of the present disclosure, when the state of the lock-up clutch is shifted from the acceleration flex control state to the deceleration flex control state, the torque capacity of the lock-up clutch is controlled based on the target torque capacity of the lock-up clutch in the acceleration flex control state, during a period until the target torque capacity of the lock-up clutch in the acceleration flex control state falls below the target torque capacity of the lock-up clutch in the deceleration flex control state. Accordingly, when the state of the lock-up clutch is switched from the acceleration flex control state to the deceleration flex control state, the target torque capacity of the lock-up clutch does not change largely. Therefore, the state of the lock-up clutch can be shifted from the acceleration flex control state to the deceleration flex control state, while suppressing occurrence of the blow-up of the engine speed and an undershoot of the differential rotation speed.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device of a lock-up clutch that is mounted on a vehicle including a torque converter that transmits output torque of an engine to a transmission and a lock-up clutch that can directly connect a side of the engine with a side of the transmission of the torque converter, and controls a state of the lock-up clutch to any one of an engaged state, a released state, a deceleration flex control state in which a differential rotation speed of the lock-up clutch being a rotation speed obtained by subtracting a rotation speed of an output shaft from a rotation speed of an input shaft of the lock-up clutch is controlled to a negative value when an accelerator operation amount is zero, and an acceleration flex control state in which the differential rotation speed of the lock-up clutch is controlled to a positive value when the accelerator operation amount is greater than zero, the control device of the lock-up clutch comprising:

a deceleration flex-torque calculation unit configured to calculate a target torque capacity of the lock-up clutch when the state of the lock-up clutch is controlled to the deceleration flex control state;

an acceleration flex-torque calculation unit configured to calculate a target torque capacity of the lock-up clutch when the state of the lock-up clutch is controlled to the acceleration flex control state; and a control unit configured to control a torque capacity of the lock-up clutch to a target torque capacity calculated by the acceleration flex-torque calculation unit, during a period until a target torque capacity calculated by the acceleration flex-torque calculation unit falls below a target torque capacity calculated by the deceleration flex-torque calculation unit, when the state of the lock-up clutch is shifted from the acceleration flex control state to the deceleration flex control state in accordance with the accelerator operation amount becoming zero.

2. The control device of a lock-up clutch according to claim 1, wherein the control unit is configured to control the state of the lock-up clutch to the deceleration flex control state, when the torque converter becomes in a driven state in which a speed ratio is greater than 1 during a period until a target torque capacity calculated by the acceleration flex-torque calculation unit falls below a target torque capacity calculated by the deceleration flex-torque calculation unit.

3. The control device of a lock-up clutch according to claim 2, wherein in a case where a target torque capacity calculated by the acceleration flex-torque calculation unit does not fall below a target torque capacity calculated by the deceleration flex-torque calculation unit even when a pre-determined time has passed since the accelerator operation amount becomes zero, the control unit is configured to control the state of the lock-up clutch to the deceleration flex control state.

4. The control device of a lock-up clutch according to claim 3, wherein when controlling the state of the lock-up clutch to the deceleration flex control state, the control unit is configured to continuously decrease the torque capacity of the lock-up clutch from the target torque capacity calculated by the acceleration flex-torque calculation unit to the target torque capacity calculated by the deceleration flex-torque calculation unit.

5. The control device of a lock-up clutch according to claim 1, wherein in a case where a target torque capacity calculated by the acceleration flex-torque calculation unit does not fall below a target torque capacity calculated by the deceleration flex-torque calculation unit even when a pre-determined time has passed since the accelerator operation amount becomes zero, the control unit is configured to control the state of the lock-up clutch to the deceleration flex control state.

6. The control device of a lock-up clutch according to claim 5, wherein when controlling the state of the lock-up clutch to the deceleration flex control state, the control unit is configured to continuously decrease the torque capacity of the lock-up clutch from the target torque capacity calculated by the acceleration flex-torque calculation unit to the target torque capacity calculated by the deceleration flex-torque calculation unit.

* * * * *